June 28, 1932.  N. GADDINI  1,864,900

REEL

Filed Oct. 13, 1931  3 Sheets-Sheet 1

Inventor

Norman Gaddini

By Clarence A. O'Brien
Attorney

June 28, 1932.   N. GADDINI   1,864,900
REEL
Filed Oct. 13, 1931   3 Sheets-Sheet 2

Inventor
Norman Gaddini
By Clarence A. O'Brien
Attorney

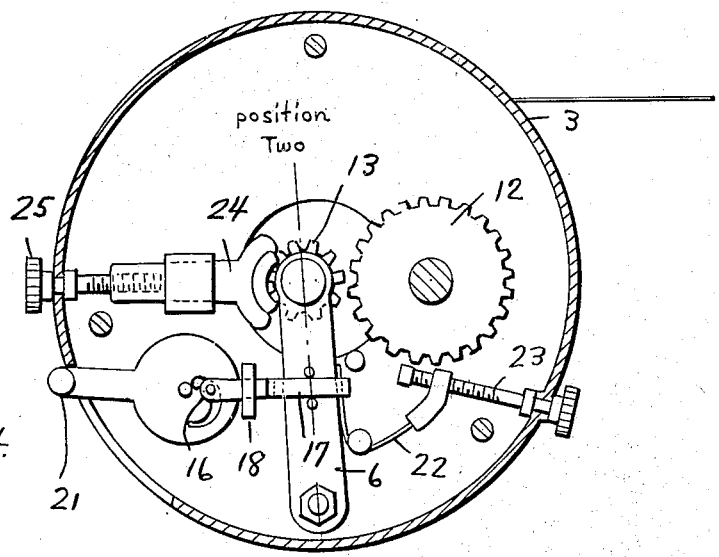
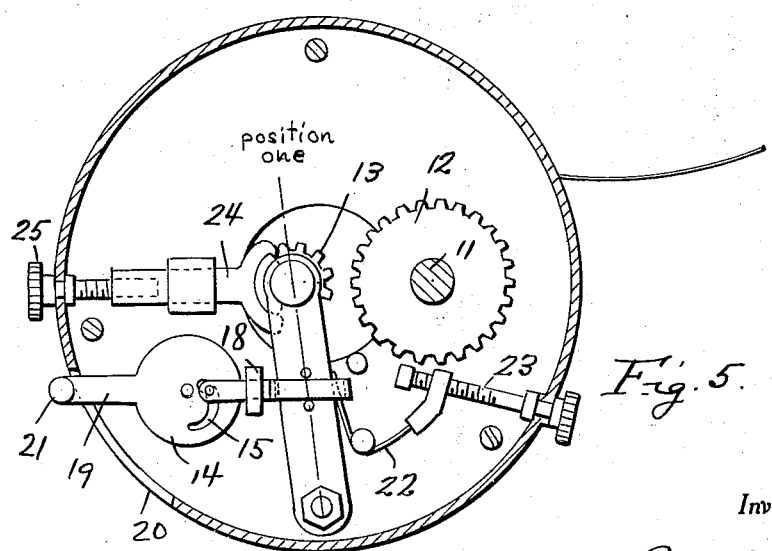

Patented June 28, 1932

1,864,900

UNITED STATES PATENT OFFICE

NORMAN GADDINI, OF WINTERS, CALIFORNIA

REEL

Application filed October 13, 1931. Serial No. 568,631.

This invention relates to a fishing reel, the general object of the invention being to provide a reel which has automatic thumbing which prevents back flare and eliminates snarls and tangles.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 4 is a view similar to Fig. 2 but showing the parts in a different position.

Fig. 5 is a view similar to Fig. 4, but showing the parts in striking position.

Figure 1:
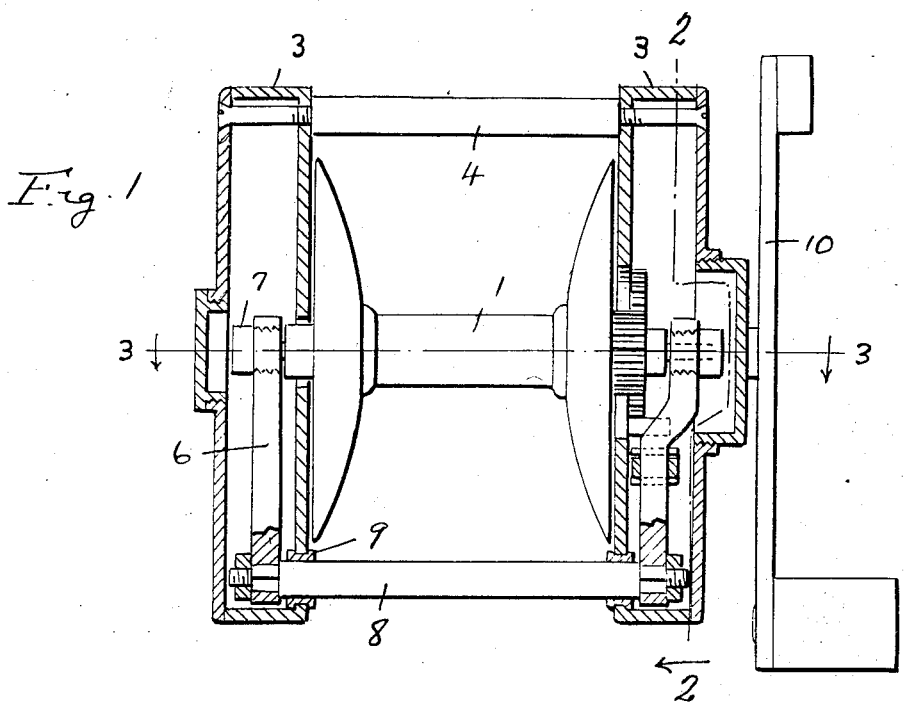
Figure 1 is a vertical sectional view through the improved reel.

In these drawings, the numeral 1 indicates the spool, and the numeral 3 indicates the two end housings which are connected together by the spacing members 4, the spool having its ends passing through holes in the housing, said holes being enlarged as shown at 5 to permit swinging movement of the spool as will be hereinafter described.

An arm 6 is located in each housing and has a bearing member 7 at its upper end for receiving the bearing of the spool and the lower ends of these arms are connected to a cross bar 8 which is supported for rocking movement in the lower parts of the housing through means of the bushings 9.

The winding handle is shown at 10 and the stem 11 of this handle carries a gear 12 located in one of the housings and that end of the spool located in the same housing has a gear 13 attached thereto. A disk 14 is pivoted in the same housing and has a cam slot 15 therein to receive a pin 16 carried by a member 17 which is of yoke shape and the arm 6 in said housing passes through this yoke-shaped member. The stem of the yoke-shaped member is guided in the guide 18.

A stem 19 is attached to the disk and extends through the slot 20 in the housing and has a handle part 21 at its outer end. A spring 22, adjustable by means of the set screw 23 engages the arm 6 and tends to hold the arms, the part 8 and the spool in the positions they occupy in Fig. 5, with a part of the spool trunnion engaging the brake member 24 adjustable through means of the set screw 25. However, when the stem 19 and the disk 14 are pushed to the bottom end of the slot 20 as shown in Fig. 2, the spring 22 will be compressed and the parts moved to a position where the gear 13 will mesh with the gear 12 as shown in Fig. 2.

Figure 2:
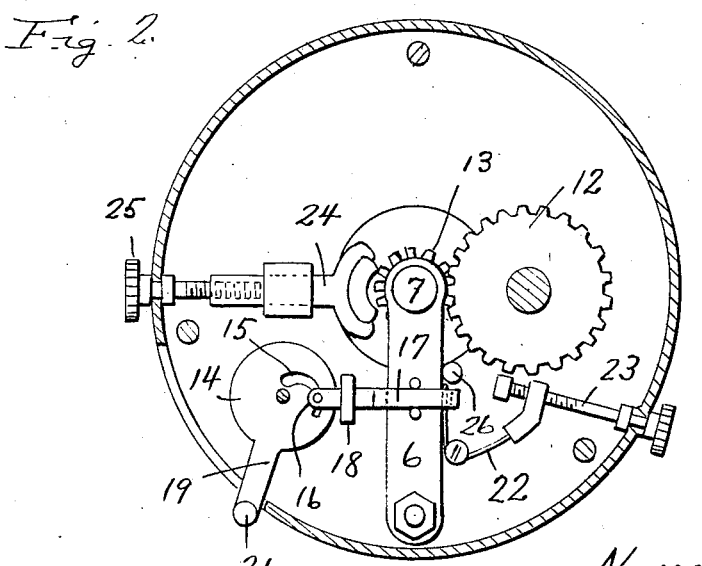
Fig. 2 is a section on the line 2—2 of Fig. 1.
Figure 3:
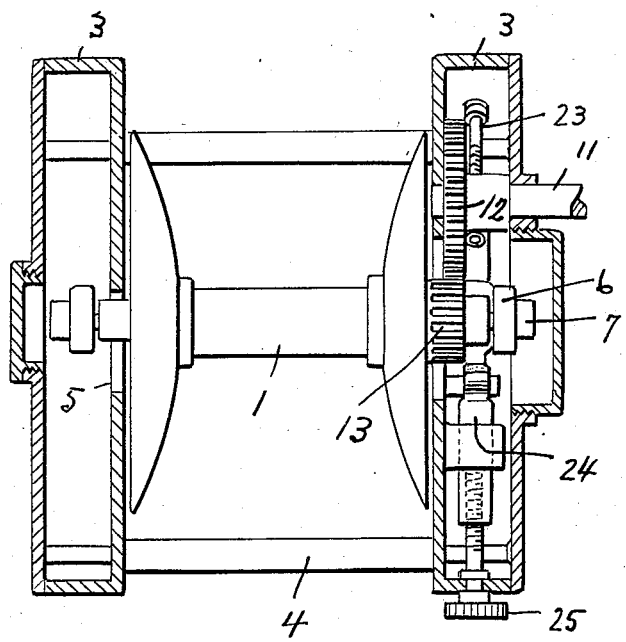
Fig. 3 is a section on the line 3—3 of Fig. 1.
Figure 6:
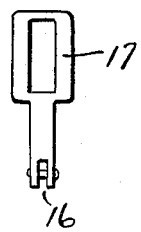
Fig. 6 is a view of the cam operated member.

A stop pin 26 limits the movement of the parts in this direction as also shown in Fig. 2. When the cam disk 14 is moved to the position it occupies in Fig. 5, the spring will move the arms 6, rod 8 and the spool, to the position it occupies in Fig. 5, with a trunnion of the spool against the brake 24. The spool is then free as the gears 12 and 13 are out of mesh and the spool can rock between the positions 1 and 2 shown in Figs. 4 and 5.

Thus in casting the pull of the line by the motion of the bait and sinker tends to pull the frame composed of the two arms and the shaft or rod 8 to position 2 or the position shown in Fig. 4, where the spool is free. As the bait and sinker strikes the water and slack occurs in the line, the spring 22 forces the parts to the position shown in Fig. 5, with a part of the spool engaging the brake so that the brake acts on the spool to eliminate the excessive motion of the spool and thus prevent back lashing.

Thus as the bait hits the water, the spool is automatically stopped. The device automatically thumbs the line to prevent the backlashing so that it is not necessary for the fisherman to thumb the spool after the bait and sinker has passed over his head in making the cast. As soon as the bait and sinker has passed over his head, the thumb is released and no attention need be paid to thumbing or backlashing.

The caster may, if desired, apply the thumb to spool, as the device does not interfere with the hand thumbing. Of course, when the person wishes to wind up the line, the cam disk is moved to the position shown in Fig. 2, where the two gears will engage each other and thus by turning the handle 10, the spool is turned.

The square socket construction shown in the drawings, allows the entire reel to be taken apart in cleaning, oiling, etc.

As will be seen the line is free as it does not pass through any appliances on the reel, and thus there is no excessive wear or friction on the line, and no continued drag to retard the cast or distance. The device can be used on any type reel and provides free spooling with the spool stopped automatically when bait hits the water.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. A fishing reel of the character described comprising a supporting frame, a spool rotatably arranged therein, hand operated means for rotating the spool, a brake, spring means for normally holding the spool against the brake but permitting the spool to be moved away from the brake when the cast is being made, and manually operated means for moving the spool into and out of engagement with the manually operated rotating means.

2. A fishing reel comprising a pair of housings, members connecting the housings together in spaced relation, a spool rotatably arranged between the housings and having portions entering the housings, a U-shaped frame rotatably supported by the housings and having its limbs located therein and in which the ends of the spool are journalled, a manually operated gear located in one of the housings, a gear on a part of the spool for meshing therewith, an adjustable brake member, an adjustable spring for normally holding the frame in a position with a part of the spool against said member, but permitting the parts to be moved to a position where the spool is free of the brake member under the weight of the sinker and bait being cast, and manually operated means for moving the U-shaped frame to a position where the two gears will be in mesh or the gears will be out of mesh.

3. A fishing reel comprising a pair of housings, members connecting the housings together in spaced relation, spool rotatably arranged between the housings and having portions entering the housings, a U-shaped frame rotatably supported by the housings, and having its limbs located therein and in which the ends of the spool are journalled, a manually operated gear located in one of the housings, a gear on a part of the spool for meshing therewith, an adjustable brake member, an adjustable spring for normally holding the frame in a position with a part of the spool against said member, but permitting the parts to be moved to a position where the spool is free of the brake member under the weight of the sinker and bait being cast, and manually operated means for moving the U-shaped frame to a position where the two gears will be in mesh or the gears will be out of mesh, said means consisting of a cam member, a yoke member, having a part engaging the cam member, and another part engaging one limb of the U-shaped frame, and a handle on the cam member for operating the same.

In testimony whereof I affix my signature.

NORMAN GADDINI.